US008199153B2

(12) United States Patent
Fujimori

(10) Patent No.: US 8,199,153 B2
(45) Date of Patent: Jun. 12, 2012

(54) IMAGE DISPLAY SYSTEM AND IMAGE DISPLAY APPARATUS

(75) Inventor: Toshiki Fujimori, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 991 days.

(21) Appl. No.: 11/774,157

(22) Filed: Jul. 6, 2007

(65) Prior Publication Data

US 2008/0055320 A1 Mar. 6, 2008

(30) Foreign Application Priority Data

Aug. 31, 2006 (JP) ................................. 2006-235138

(51) Int. Cl.
*G06F 15/00* (2006.01)
*G06T 1/00* (2006.01)
*G06T 1/60* (2006.01)
*G09G 5/00* (2006.01)
*H04N 5/64* (2006.01)

(52) U.S. Cl. .......... 345/501; 345/1.2; 345/2.1; 345/530; 348/744

(58) Field of Classification Search ........................ None
See application file for complete search history.

(56) References Cited

U.S. PATENT DOCUMENTS

| 4,721,928 | A | 1/1988 | Yoshida |
| 4,876,657 | A | 10/1989 | Saito et al. |
| 5,986,648 | A | 11/1999 | Okada et al. |
| 6,771,278 | B2 | 8/2004 | Shigeta |
| 6,788,306 | B2 | 9/2004 | Yamaguchi et al. |
| 6,860,609 | B2 * | 3/2005 | Olson et al. .................. 353/122 |
| 7,061,506 | B2 | 6/2006 | Matsuda |
| 7,224,404 | B2 | 5/2007 | An et al. |
| 7,245,307 | B2 | 7/2007 | Matsuda |
| 7,417,643 | B2 | 8/2008 | Matsuda |
| 2001/0048445 | A1 | 12/2001 | Ikeno |
| 2004/0008159 | A1 | 1/2004 | Cunha et al. |
| 2005/0235215 | A1 * | 10/2005 | Dunn et al. .................. 715/740 |
| 2007/0040993 | A1 * | 2/2007 | Yokoyama et al. ............. 353/42 |
| 2007/0146556 | A1 * | 6/2007 | Fujimori ...................... 348/744 |

FOREIGN PATENT DOCUMENTS

JP A-08-179729 7/1996

(Continued)

OTHER PUBLICATIONS

Mar. 9, 2010 Office Action issued in U.S. Appl. No. 11/610,215.

(Continued)

*Primary Examiner* — Tize Ma
(74) *Attorney, Agent, or Firm* — Oliff & Berridge, PLC

(57) ABSTRACT

An image display system includes an information processing apparatus and an image display apparatus. The information processing apparatus includes: a processing unit that acquires image information and executes image processing for the image information; a processed image information acquisition command unit that gives an acquisition command to an image display apparatus; and a transmitting unit that transmits the processed image information and the acquisition command to the image display apparatus. The image display apparatus includes: an image receiving unit that receives the processed image information; a non-volatile image information storing unit that stores the processed image information; an acquiring unit that acquires at least either the processed image information received by the receiving unit or the processed image information stored in the storing unit; and a control unit that commands an apparatus display unit to display an image corresponding to the processed image information acquired by the acquiring unit.

9 Claims, 11 Drawing Sheets

FOREIGN PATENT DOCUMENTS

| | | |
|---|---|---|
| JP | A-2001-228850 | 8/2001 |
| JP | A-2001-337660 | 12/2001 |
| JP | A-2002-175068 | 6/2002 |
| JP | A-2002-300545 | 10/2002 |
| JP | A-2003-060986 | 2/2003 |
| JP | A-2004-69996 | 3/2004 |
| JP | A-2004-147014 | 5/2004 |
| JP | A-2004-191454 | 7/2004 |
| JP | A-2004-341269 | 12/2004 |
| JP | A 2005-079727 | 3/2005 |
| JP | A-2005-150818 | 6/2005 |

OTHER PUBLICATIONS

Oct. 7, 2009 Office Action issued in U.S. Appl. No. 11/610,215.
Co-pending U.S. Appl. No. 11/610,215, filed Dec. 13, 2006; Fujimori, Toshiki.
Aug. 23, 2010 Office Action issued in U.S. Appl. No. 11/610,215.
May 19, 2011 Office Action issued in U.S. Appl. No. 11/610,215.
Office Action issued in U.S. Appl. No. 11/610,215 dated Jan. 7, 2011.

\* cited by examiner

IMAGE DISPLAY SYSTEM AND IMAGE DISPLAY APPARATUS

BACKGROUND

1. Technical Field

The present invention relates to an image display system and an image display apparatus.

2. Related Art

A known image display system has an information processing device such as PC (personal computer) and an image display apparatus such as projector, and the image display apparatus displays an image corresponding to image data transmitted from the information processing apparatus on the image display apparatus (for example, see JP-A-2005-79727).

According to the image display system disclosed in JP-A-2005-79727, the PC contains a storage device; and image data corresponding to an image of a subject shot by a camera is processed and stored in the PC. Thus, the image of the subject having been taken can be easily re-projected. A certain type of the image display system transmits the image data of the subject shot by the camera to the projector in rear time, and another type reads the image data stored in the PC and then transmits the data to the projector.

According to the image display system shown in JP-A-2005-79727 which stores image data in the PC, the use of the PC is essential when the projector displays the image corresponding to the image data. Thus, when the place at which the image is displayed is desired to be shifted to another place, for example, the PC as well as the projector needs to be shifted to that place. Therefore, portability of the system is unsatisfactory.

In addition, when the projector displays the image corresponding to either the image data of the subject currently being shot or the image data stored in the PC, the image data needs to be transmitted to the projector from the PC. Thus, there is a possibility of delayed image display depending on the volume of the image data.

SUMMARY

It is an advantage of some aspects of the invention to provide an image display system and an image display apparatus having enhanced portability and capable of reducing delay of image display.

An image display system according to a first aspect of the invention includes an information processing apparatus and an image display apparatus. The information processing apparatus includes: an image processing unit that acquires image information and executes predetermined image processing for the acquired image information; a processed image information acquisition command unit that generates an acquisition command which is transmitted to an image display apparatus connected with the information processing apparatus such that information is transmittable and receivable to and from the information processing apparatus via an information transmitting unit; and an information transmitting unit that transmits the processed image information and the acquisition command to the image display apparatus. The image display apparatus includes: an image receiving unit that receives the processed image information transmitted from the information processing apparatus via the information transmitting unit; a non-volatile image information storing unit that stores the processed image information; a storing operation executing unit that executes a storing operation for storing the processed image information in the image information storing unit; a processed image information acquiring unit that acquires at least either the processed image information received by the information receiving unit or the processed image information stored in the image information storing unit in response to the acquisition command; and an image display control unit that commands an image display apparatus display unit to display an image corresponding to the processed image information acquired by the processed image information acquiring unit.

In this structure, the image display apparatus has the non-volatile image information storing unit and therefore image information can be stored for a long period of time. In this case, the information processing apparatus is not necessarily required at the time of display of an image corresponding to the image information stored in the image information storing unit, and thus the portability of the system can be enhanced.

At the time of display of an image corresponding to the image information stored in the image information storing unit, the image can be reproduced only by giving a reproduction command from the information processing apparatus. Thus, transmission of the image information from the information processing apparatus to the image display apparatus is not necessary, and no problem arises from the speed of transmission between the information processing apparatus and the image display apparatus. Accordingly, image display can be smoothly provided without delay for the user.

According to the image display system of the first aspect of the invention, it is preferable that the image display apparatus includes an image information synthesizing unit that synthesizes the processed image information. When an acquisition command for acquiring the processed image information received by the information receiving unit and the processed image information stored in the image information storing unit is given, it is preferable that the processed image information acquiring unit sequentially acquires the processed image information received by the information receiving unit from the information receiving unit and acquires the processed image information stored in the image information storing unit from the image information storing unit, and that the image information synthesizing unit synthesizes both types of the processed image information acquired by the processed image information acquiring unit.

In this structure, the processed image information received by the information receiving unit and the processed image information stored in the image information storing unit are acquired by the processed image information acquiring unit and then synthesized by the image information synthesizing unit when the acquisition command for acquiring both types of image information is given. Thus, so-called picture-in-picture display where images corresponding to both types of image information are simultaneously displayed can be easily provided. In this case, it is possible to immediately provide a greater volume of information for the audience by displaying plural images of reference materials at the same time during presentation, for example.

In this structure, the necessity for transmitting image information from the information processing apparatus to the image display apparatus is similarly eliminated by storing the image information in the image information storing unit in advance. Thus, image display can be smoothly provided without delay for the user.

According to the image display system of the first aspect of the invention, it is preferable that the information processing apparatus includes an image information compressing unit that compresses the processed image information, and that the image display apparatus includes an image information expanding unit that expands the compressed processed image information.

The compression method herein may be a method of transmitting only different information when any change is produced between frames of image information, or an encoding method using Huffman codes.

In this structure, the processed image information is transmitted to the image display apparatus after compressed by the information processing apparatus. Thus, the volume of the image information to be stored in the image information storing unit is decreased, and therefore a larger volume of image information can be stored in the image information storing unit.

In addition, since the data volume of the image information is reduced by compression, the time required for transmission of the image information can be shortened.

According to the image display system of the first aspect of the invention, it is preferable that the information processing apparatus includes an image information storage requiring unit that generates a storage requiring signal for requiring storage of the processed image information transmitted from the information transmitting unit, and transmits the storage requiring signal via the information transmitting unit, and that the storing operation executing unit of the image display apparatus executes a storing operation for storing the processed image information in the image information storing unit in response to the storage requiring signal.

In this structure, the storing operation executing unit of the image display apparatus stores only the processed image information required by the information processing apparatus in the image information storing unit. Thus, unnecessary processed image information is not stored in the image information storing unit, and therefore a larger volume of image information can be stored in the image information storing unit.

An image display apparatus as a sub combination constituting the image display system of the first aspect off the invention is also provided according to a second aspect of the invention.

More specifically, the image display apparatus according to the second aspect of the invention includes: an information receiving unit that receives processed image information transmitted from an information processing apparatus via an information transmitting unit; a non-volatile image information storing unit that stores the processed image information; a storing operation executing unit that executes a storing operation for storing the processed image information in the image information storing unit; a processed image information acquiring unit that acquires at least either the processed image information received by the information receiving unit or the processed image information stored in the image information storing unit in response to the acquisition command transmitted from the information processing unit via the information transmitting unit; and an image display control unit that commands an image display apparatus display unit to display an image corresponding to the processed image information acquired by the processed image information acquiring unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment according to the invention is hereinafter described with reference to the drawings.

Structure of Projection System

Figure 1:
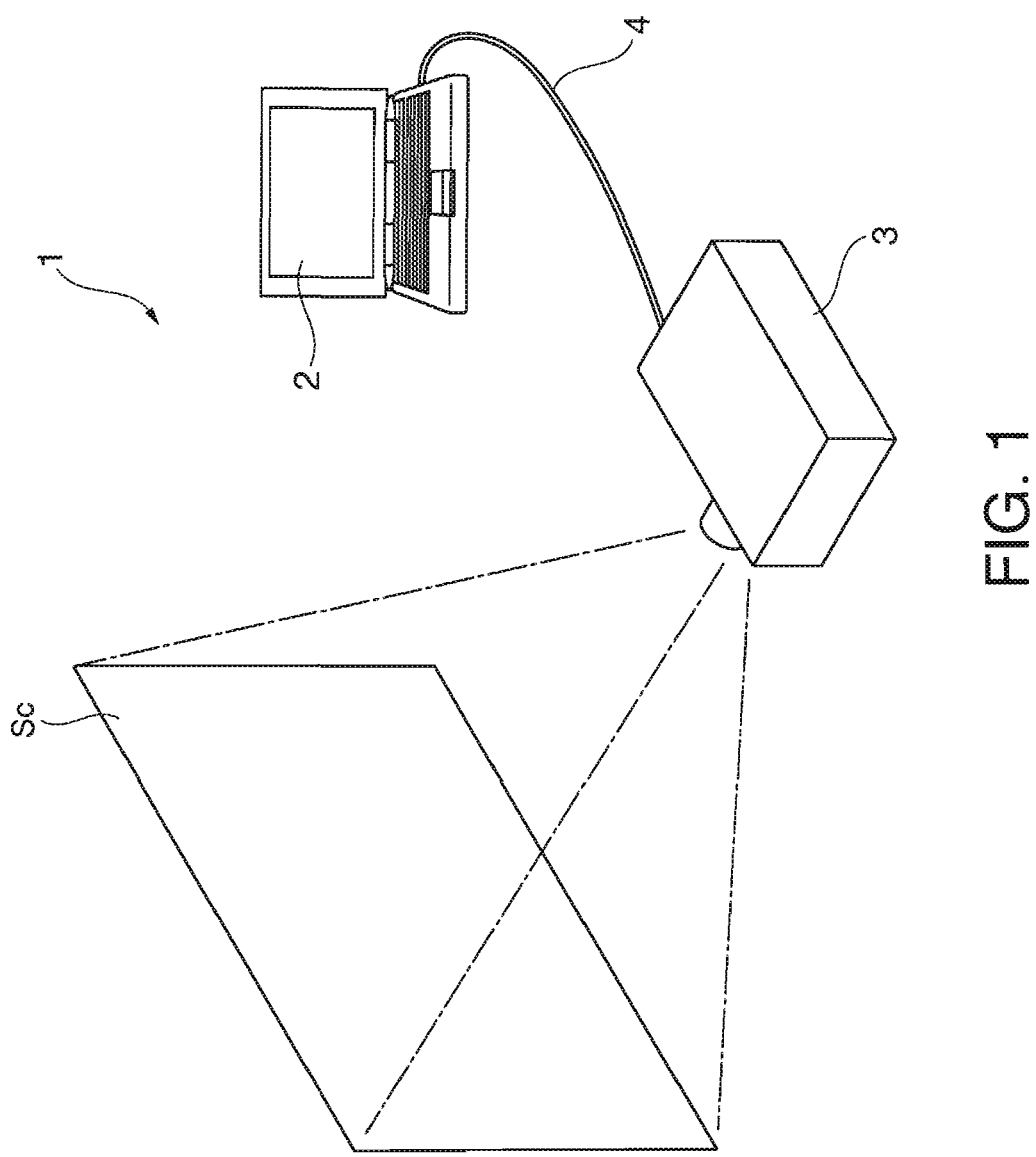
FIG. 1 illustrates a structure of an image display system in a first embodiment according to the invention.

FIG. 1 illustrates a structure of a projection system 1 as an image display system.

As can be seen from FIG. 1, the projection system 1 includes a PC 2 as an information processing apparatus, a projector 3 as an image display apparatus, and a USB (universal serial bus) cable 4 as an information transmitting unit.

In the projection system 1 having this structure, the PC 2 processes image data as image information, and transmits the processed image data to the projector 3. Then, the projector 3 stores the image data processed by the PC 2, and projects an image corresponding to the processed image data on the screen Sc for display. The PC 2 and the projector 3 are connected by the USB (universal serial bus) cable 4 such that various types of information are mutually transmittable and receivable.

The information transmitting unit may be of any types which can transmit digital signals other than the USB cable 4. For example, information transmitting units containing specifications for transmitting digital signals by wire such as LAN (local area network) cable or specifications for transmitting digital signals via wireless medium (radio waves, sound, infrared rays, etc.) may be used.

Structure of PC

Figure 2:
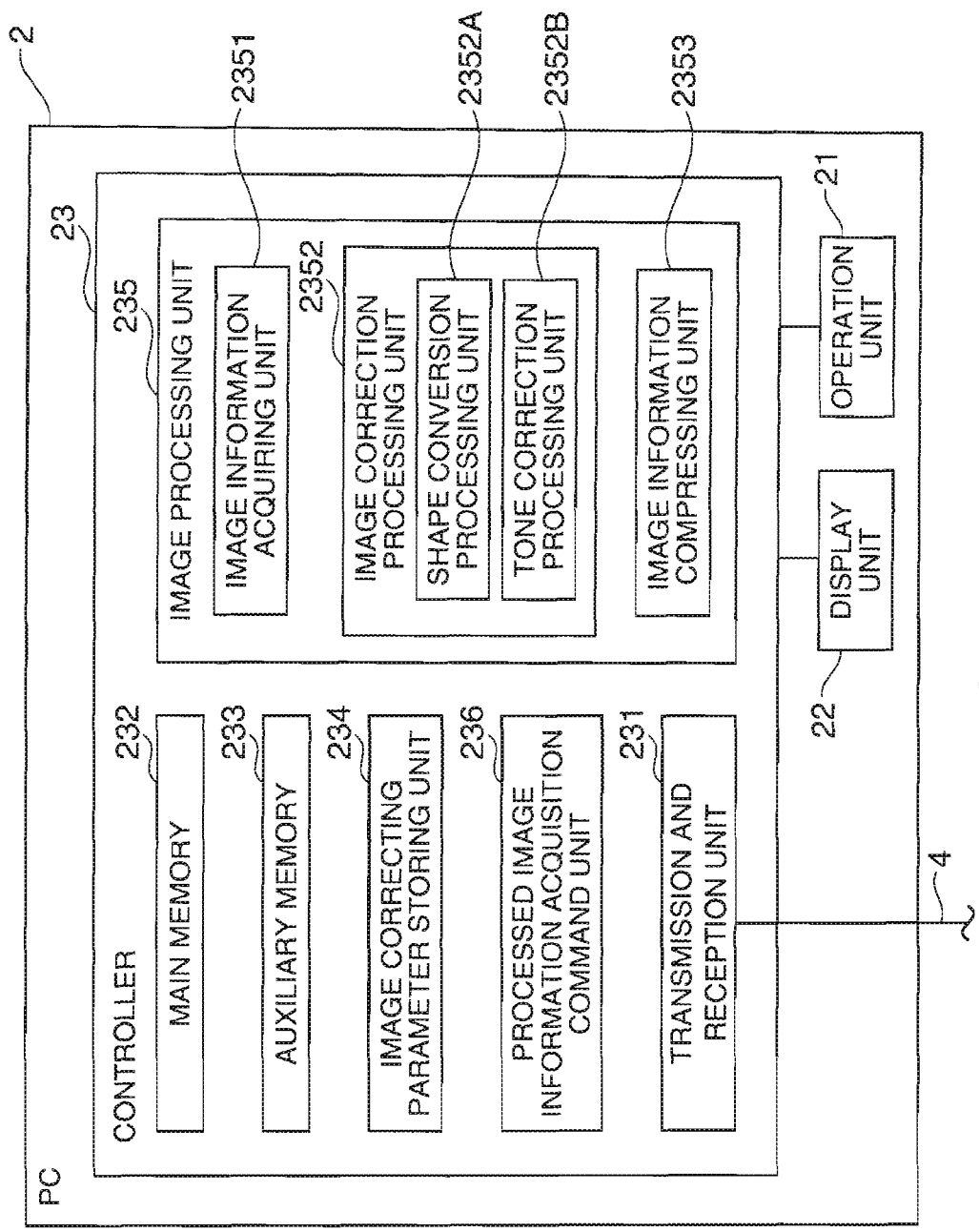
FIG. 2 is a block diagram showing a general structure of an information processing apparatus in the first embodiment.

FIG. 2 is a block diagram showing a general structure of the PC 2.

As shown in FIG. 2, the PC 2 includes an operation unit 21, a display unit 22, and a controller 23.

The operation unit 21 has various operation buttons operated by a keyboard, a mouse, or the like for inputting. Predetermined operation information is inputted in an appropriate manner from the operation unit 21 to the controller 23 in accordance with the input operation by the user through the operation unit 21.

Input operation for setting various conditions through the operation unit 21 is not limited to the operation of the operation buttons but may be touch panel operation voice operation, or other input operations.

The display unit 22 displays predetermined information under the control of the controller 23. In a process for setting or renewing information stored in a memory to be described later contained in the controller 23 in response to the input operation through the operation unit 21, for example, the display unit 22 displays data in the memory outputted from the controller 23 in an appropriate manner.

The controller 23 executes a predetermined program in accordance with operation information inputted by the user through the operation unit 21 to control the entire PC 2. As shown in FIG. 2, the controller 23 includes a transmission and reception unit 231, a main memory 232, an auxiliary memory 233, an image correcting parameter storing unit 234, an image processing unit 235, and a processed image information acquisition command unit 236. The respective units 231 through 236 are connected by not-shown buses such that necessary information can be transmitted and received by these units.

The transmission and reception unit 231, is a section for transmitting and receiving data based on specifications corresponding to various information transmission units in this embodiment, the transmission and reception unit 231 is connected with the projector 3 via the USB cable 4 so as to transmit and receive various types of information to and from the projector 3. The transmission and reception unit 231 also functions as an information transmitting unit which transmits image data obtained after image correction processing by the controller 23 and an acquisition command generated by the processed image information acquisition command unit 236 to be described later to the projector 3 via the USB cable 4.

The main memory 232 stores data used for processing by the image processing unit 235 or other units, and other data. Examples of various types of data herein include operation information inputted by the user through the operation unit 21, data inputted through the transmission and reception unit 231, data used for processing by the image processing unit 235, and other data.

The auxiliary memory 233 is a section for storing image data desired to be displayed by the user. Examples of the auxiliary memory 233 include HD (hard disc), DVD (digital versatile disc), memory card, and others.

The image correcting parameter storing unit 234 stores correcting parameters used for image correction in accordance with characteristics of the projector 3. Examples of the correcting parameters stored in the image correcting parameter storing unit 234 include various correcting parameters for trapezoidal correction, color conversion, γ correction, VT-γ correction, and other parameters.

It is possible to install the correcting parameters in the image correcting parameter storing unit 234 by inserting a memory card or a CD-ROM on which these correcting parameters are recorded into the PC 2. Alternatively, the PC 2 may read predetermined correcting parameters from the projector 3 via the USB cable 4 and store the parameters in the image correcting parameter storing unit 234.

The image processing unit 235 contains GPU (graphics processor unit), for example, and executes the correcting process discussed above for the image data. The image processing unit 235 has an image information acquiring unit 2351, an image correction processing unit 2352, and an image information compressing unit 2353.

The image information acquiring unit 2351 acquires image data from the auxiliary memory 233, and decrypts image data for each frame by decoding in accordance with the recording system. For example, image data having 8 bit color information (tone data) for each pixel is obtained by decryption. The image information acquiring unit 2351 outputs the decrypted image data to the image correction processing unit 2352.

As shown in FIG. 2, the image correction processing unit 2352 has a shape conversion processing unit 2352A and a tone correction processing unit 2352B.

The shape conversion processing unit 2352A executes shape conversion processing for the image data decrypted by the image information acquiring unit 2351 such as trapezoidal corrections correction to match the image data with the shape of a screen Sc when the screen Sc has a curved surface, and correction for correcting distortion caused by a lens contained in the projector 3. Then, the shape conversion processing unit 2352A outputs the image data after the shape conversion processing to the tone correction processing unit 2352B.

The tone correction processing unit 2352B executes tone converting correction (tone correction processing) for the tone data contained in the image data outputted from the shape conversion processing unit 2352A in accordance with the color characteristics of the projector 3. Examples of the tone correction processing include color conversion, γ correction, VT-γ correction, color unevenness correction, and other processing. For example, tone data initially having 8 bits can be corrected into data having 10 bits or more with higher accuracy by the tone correction processing, The image information compressing unit 2353 compresses the image data corrected by the image correction processing unit 2352. Examples of the compression method include JPEG encoding method capable of avoiding lack of data and other methods. Then, the image information compressing unit 2353 transmits the compressed data to the projector 3 via the transmission and reception unit 231 and the USB cable 4 in an appropriate manner.

The processed image information acquisition command unit 236 generates a command for commanding the projector 3 to acquire the processed image data based on the operation information inputted by the user through the operation unit 21. More specifically, when the user requires real-time display of an image corresponding to image data contained in the auxiliary memory 233, the processed image information acquisition command unit 236 generates a command for commanding the projector 3 to sequentially acquire image data transmitted from the PC 2. When the user requires reproduction display of image data by selecting particular reproduction data information from reproduction data information representing details of image data stored in the projector 3, the processed image information acquisition command unit 236 generates a command for commanding the projector 3 to acquire image data corresponding to the selected reproduction data information from the image data stored in the projector 3. Then, the processed image information acquisition command unit 236 transmits the produced acquisition command to the projector 3 via the transmission and reception unit 231 and the USB cable 4.

The reproduction data information herein refers to recording of detailed information about the image data stored in the projector 3. Examples of the reproduction data information include index information such as recording dates and titles, and other information. The reproduction data information may be stored in the PC 2 when the PC 2 and the projector 3 recognize the reproduction data information in the common way, or the reproduction data information may be obtained from the projector 3.

Structure of Projector

Figure 3:
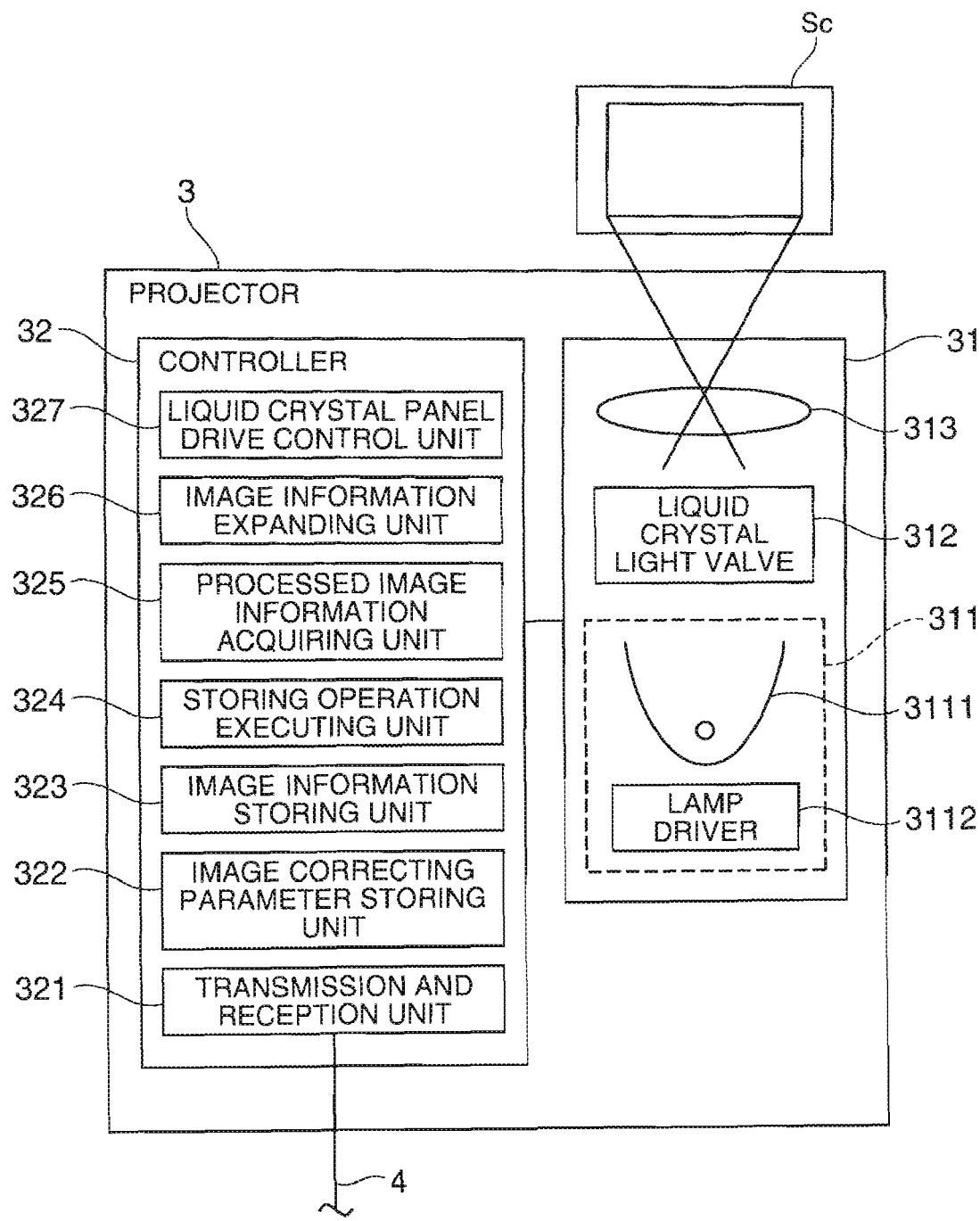
FIG. 3 is a block diagram sowing a general structure of an image display apparatus in the first embodiment.

FIG. 3 is a block diagram showing a general structure of the projector 3.

As can be seen from FIG. 3, the projector 3 includes an image projection unit 31 as an image display apparatus display unit, and a controller 32.

The image projection unit 31 produces an optical image and projects an enlarged image of the optical image on the screen Sc under the control of the controller 32. As shown in FIG. 3, the image projection unit 31 has a light source device 311, a liquid crystal light valve 312, a projection optical device 313, and other components.

The light source device 311 emits light toward the liquid crystal light valve 312 under the control of the controller 32. The light source device 311 has a light source lamp 3111 and a lamp driver 3112.

The light source lamp 3111 is constituted by an extra-high pressure mercury lamp. The light source lamp 3111 is not limited to the extra-high pressure mercury lamp, but may be other discharge emission type light source lamps such as metal halide lamp and xenon lamp. Alternatively, other self light emission elements such as light emission diode, laser diode, organic EL element, and silicone light emission element may be adopted.

The lamp driver 3112 drives the light source lamp 3111 by predetermined driving voltage under the control of the controller 32.

The liquid crystal light valve 312 is a transmissive type liquid crystal panel. The liquid crystal light valve 312 transmits or blocks light emitted from the light source lamp 3111 by varying the arrangement of liquid crystal molecules sealed in liquid crystal cells (not shown) based on the driving signal from the controller 32 to release an optical image in correspondence with the image data processed by the PC 2 toward the projection optical device 313

The projection optical device 313 projects an enlarged image of the optical image supplied from the liquid crystal light valve 312 on the screen Sc.

Thought not shown in the figure, the liquid crystal light valve 312 included in the projector 3 has three liquid crystal light valves corresponding to three colors of R, G and B. The light source device 311 has a color division optical system for dividing source Light into lights of three colors. The projection optical device 313 has a synthesizing optical system for synthesizing image lights of three colors to produce an optical image representing a color image. Structures of these optical systems may be similar to those of optical systems contained in various types of ordinary projectors.

The controller 32 controls the entire projector 3 according to control commands issued from the PC 2. As shown in FIG. 3; the controller 32 has a transmission and reception unit 321, an image correcting parameter storing unit 322, an image information storing unit 323, a storing operation executing unit 324, a processed image information acquiring unit 325, an image information expanding unit 326, and a liquid crystal panel drive control unit 327 as an image display control unit. The respective units 321 through 327 are connected by not-shown buses such that necessary information can be transmitted and received by these units.

The transmission and reception unit 321 is a section for transmitting and receiving data based on specifications corresponding to various information transmission units similarly to the transmission and reception unit 231 in the PC 2. The transmission and reception unit 321 is connected with the PC 2 so as to transmit and receive various types of data to and from the PC 2 via the USB cable 4. The transmission and reception unit 321 also functions as an information receiving unit which receives image data after image correction processing transmitted from the PC 2 via the USB cable 4.

The image correcting parameter storing unit 322 stores correcting parameters for image correction in accordance with the characteristics of the projector 3. Examples of the correcting parameters include various parameters for trapezoidal correction, luminance unevenness, color unevenness, γ correction, and other parameters.

The image information storing unit 323 is a non-volatile storage device such as hard disk, and stores image data corrected and compressed by the PC 2.

Figure 4:
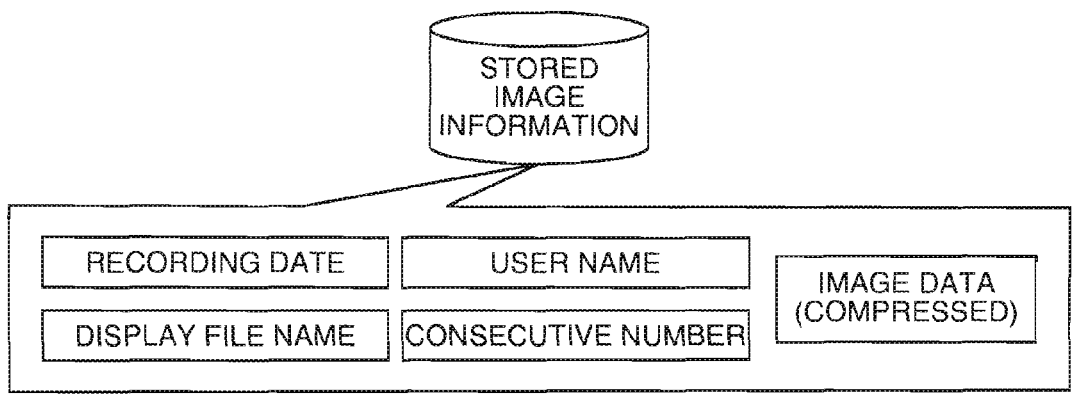
FIG. 4 shows the contents of stored image information in the first embodiment.

The storing operation executing unit 324 executes storing operation of the corrected and compressed image data in the image information storing unit 323. More specifically, the storing operation executing unit 324 adds various types of header information concerning image data to the image data and sequentially stores the resultant data as one unit data in the image information storing unit 323 as shown in FIG. 4. Examples of the various types of header information include recording dates, user names, display file names, overall consecutive numbers of image data and other information, and the various types of header information are transmitted from the PC 2.

The processed image information acquiring unit 325 acquires the corrected and compressed image data from either the transmission and reception unit 321 or the image information storing unit 323 in response to the acquisition command from the PC 2. More specifically, the processed image information acquiring unit 325 acquires the image data received by the transmission and reception unit 321, and transmits the image data to the image information storing unit 323 and the image information expanding unit 326. When image reproduction display of an image corresponding to the image data stored in the image information storing unit 323 is required, the processed image information acquiring unit 325 acquires the corresponding image data from the image information storing unit 323, and transmits the obtained data to the image information expanding unit 326.

The image information expanding unit 326 expands the compressed image data obtained by the processed image information acquiring unit 325, and outputs the expanded image data to the liquid crystal panel drive control unit 327.

The liquid crystal panel drive control unit 327 outputs a drive signal based on the image data expanded by the image information expanding unit 326 to the liquid crystal light valve 312 so that the liquid crystal light valve 312 can form an optical image corresponding to the image data processed by the PC 2.

Operation of Projection System

The operation of the projection system 1 described above is now discussed with reference to the drawings.

Figure 5:
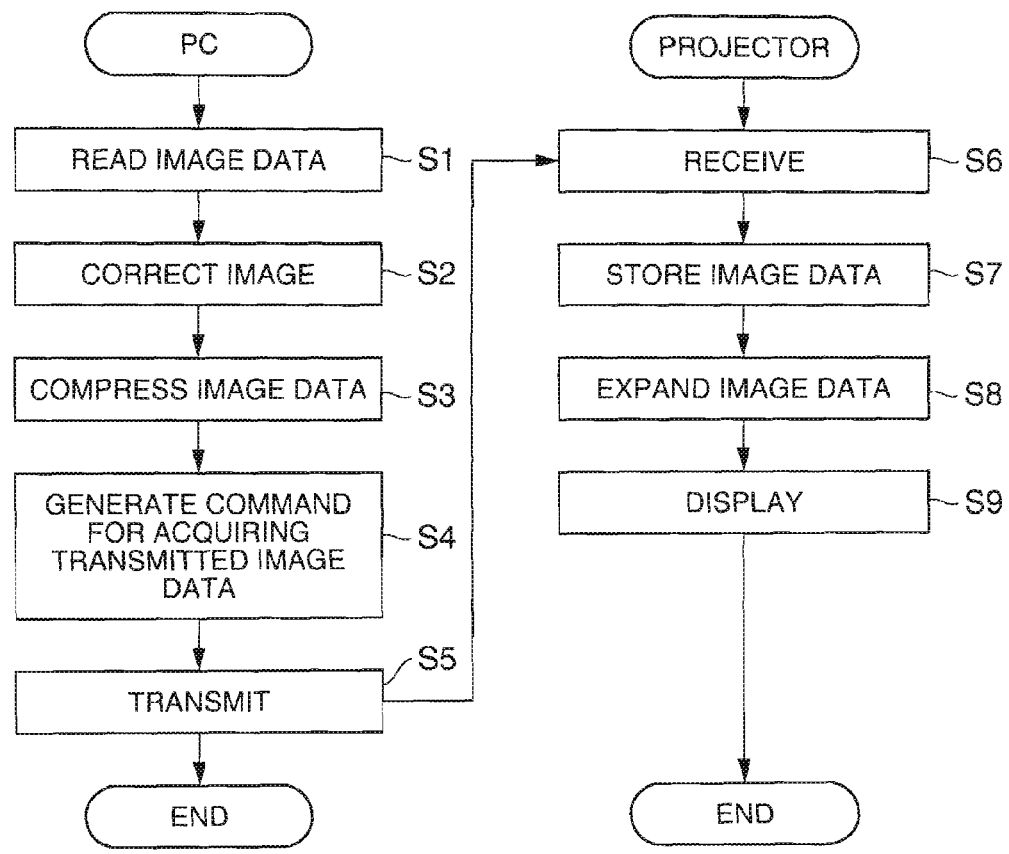
FIG. 5 is a flowchart showing an operation of the image display system in the first embodiment.
Figure 6:
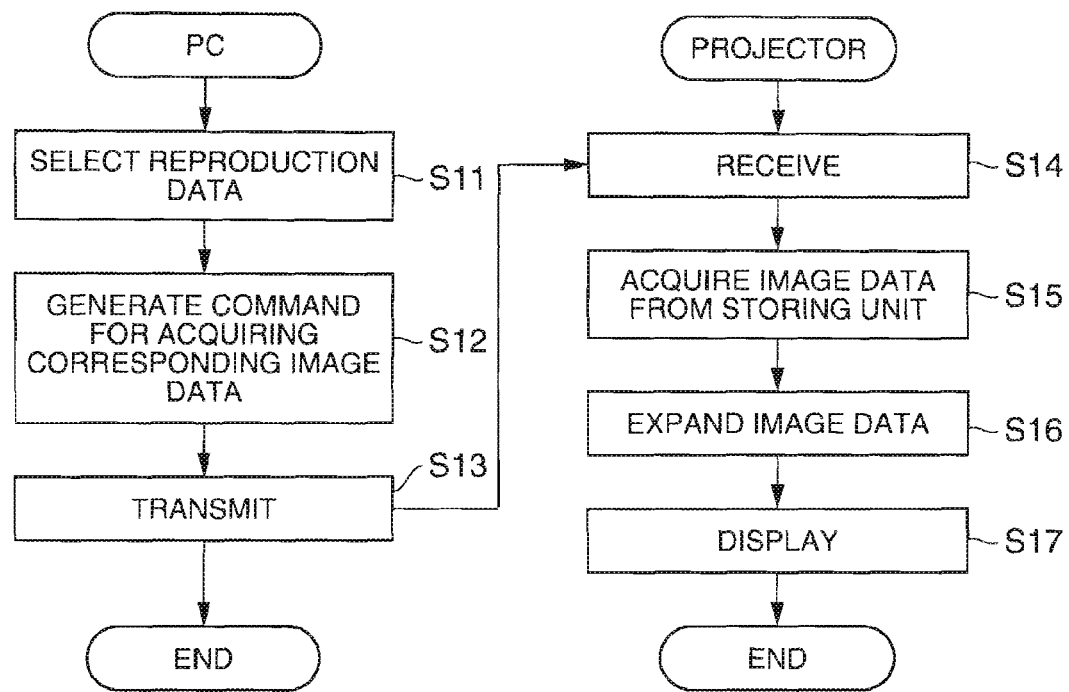
FIG. 6 is a flowchart showing an operation of the image display system in the first embodiment.

FIG. 5 is a flowchart showing an operation at the time of real-time display of an image corresponding to image data transmitted from the PC 2, and FIG. 6 is a flowchart showing an operation at the time of reproduction display of an image corresponding to image data stored in the projector 3.

The operation of the projection system 1 at the time of real-time display is initially explained with reference to FIG. 5.

When the controller 23 of the PC 2 judges that real-time display has been required based on the operation information inputted by the user, the image information acquiring unit 2351 acquires image data from the auxiliary memory 233, and decrypts the obtained image data for each frame by executing decoding, IP conversion or other processing for the image data (step S1).

The image correction processing unit 2352 performs shape conversion processing or tone conversion processing for the decrypted image data (step S2), and the image information compressing unit 2353 compresses the processed image data (step S3).

Then, the processed image information acquisition command unit 236 generates a command for commanding the projector 3 to acquire the corrected and compressed image data to be transmitted (step S4). The transmission and reception unit 231 transmits this acquisition command and the processed image data to the projector 3 via the USB cable 4 (step S5).

After step S5, the transmission and reception unit 321 of the projector 3 receives the corrected and compressed image data and the acquisition command for the image data from the PC 2. The processed image information acquiring unit 325 acquires the image data from the transmission and reception unit 321 in response to the acquisition command (step S6).

The storing operation executing unit 324 adds various types of header information concerning the obtained image data to the image data, and stores the resultant image data in the image information storing unit 323 as one unit of image data (step S7).

Subsequently, the image information expanding unit 326 expands the corrected and compressed image data obtained from the processed image information acquiring unit 325 (step S8).

Then, the liquid crystal panel drive control unit 327 outputs a drive signal based on the expanded image data to the liquid crystal light valve 312 so that the liquid crystal light valve 312 can form an optical image corresponding to the processed image data (step S9).

The operation at the time of reproduction display of an image corresponding to image data stored in the projector 3 is now discussed with reference to FIG. 6.

When the controller 23 of the PC 2 judges that reproduction display has been required based on the operation information inputted by the user, that is, when the controller 23 judges that the user has selected particular image data based on reproduction data information (step S11), the processed image information acquisition command unit 236 generates a command for commanding the projector 3 to acquire image data corresponding to the selected reproduction data information from image data stored in the image information storing unit 323 (step S12).

Then, the transmission and reception unit 231 transmits the acquisition command to the projector 3 via the USB cable 4 (step S13).

After step S12, the transmission and reception unit 321 of the projector 3 receives the acquisition command from the PC 2 (step S14). The processed image information acquiring unit 325 acquires image data from the image data stored in the image information storing unit 323 in response to the acquisition command (step S15).

Then, the image information expanding unit 326 expands the corrected and compressed image data obtained by the processed image information acquiring unit 325 (step S16). The liquid crystal panel drive control unit 327 outputs a drive signal based on the expanded image data to the liquid crystal light valve 312 so that the liquid crystal light valve 312 can form an optical image corresponding to the processed image data (step S17).

According to this embodiment, the projector 3 having the image information storing unit 323 can store image data transmitted from the PC 2. Thus, the necessity for transmitting image data from the PC 2 to the projector 3 can be eliminated at the time of display of the image corresponding to the image data.

Second Embodiment

A second embodiment according to the invention is hereinafter described with reference to the drawings.

In the second embodiment and a third embodiment to be described later, identical reference numbers are given to structures identical to the structures and operations having been described in the first embodiment or other embodiment, and the same explanation is not repeated. Also, substantially the same structures are referred to as in the same manner, and only simplified explanation is given.

According to the first embodiment having been described, the storing operation executing unit 324 of the projector 3 sequentially stores the processed image data transmitted from the PC 2 in the image information storing unit 323.

Figure 7:
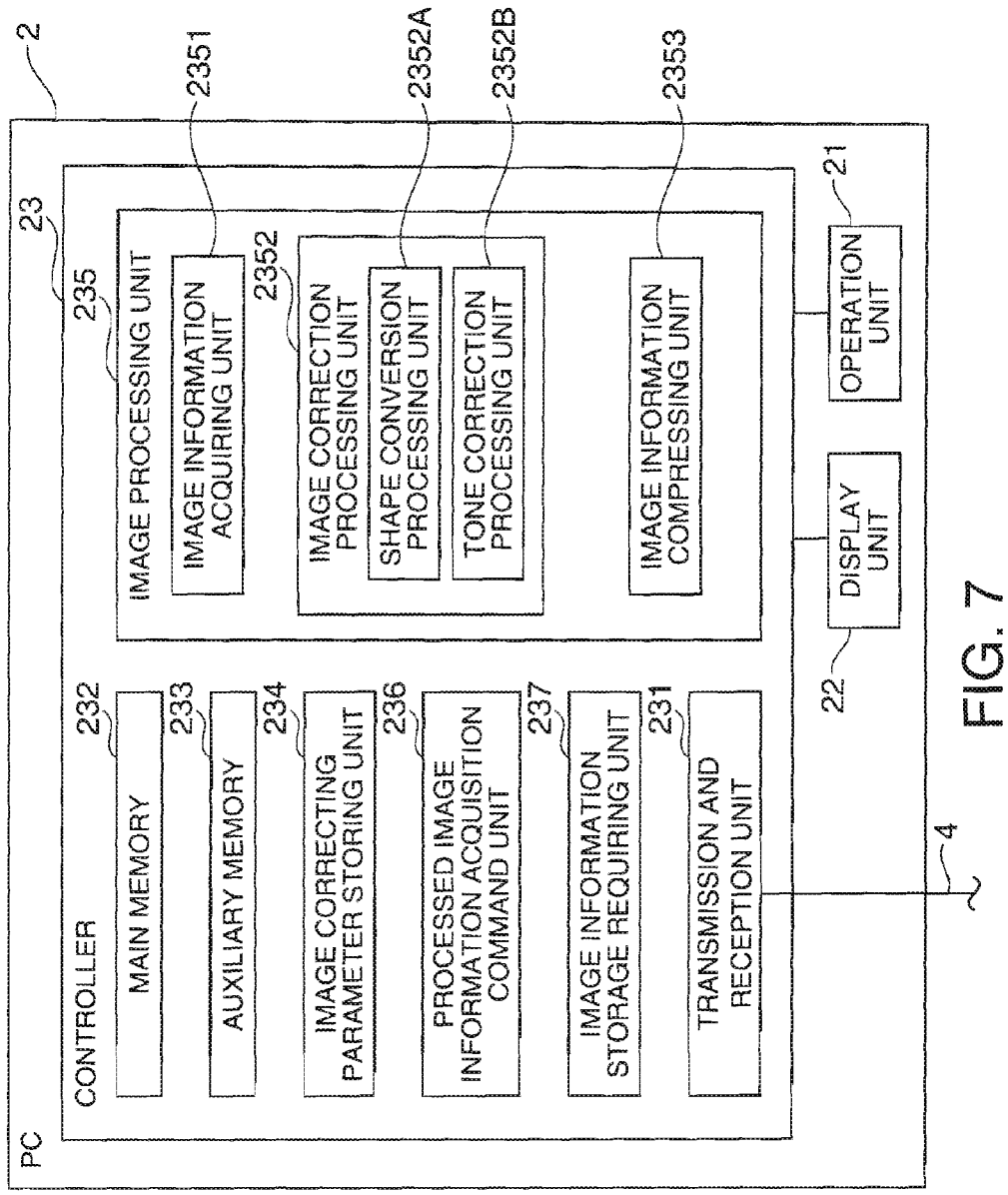
FIG. 7 is a block diagram showing a general structure of an information processing apparatus in a second embodiment according to the invention.

An image display system according to the second embodiment is different from the first embodiment in that an image information storage requiring unit 237 is provided in the PC 2 as shown in FIG. 7. In this structure, only image data required by the image information storage requiring unit 237 is stored in the image information storing unit 323.

More specifically, the image information storage requiring unit 237 of the PC 2 produces a storage requiring flag as a storage requiring signal for requiring the projector 3 to store the transmitted image data. Examples of conditions under which the storage requiring flag is to be set include the case where the flag is periodically set for each frame rate of image data, the case where difference from the previous image frame has been produced according to judgment, the case where requirement operation has been inputted by the user, and other cases.

The storing operation executing unit 324 of the projector 3 recognizes the presence or absence of the requirement for storing the image data transmitted from the PC 2 in the image information storing unit 323 based on the setting condition of the storage requiring flag, and stores only the required image data in the image information storing unit 323.

Figure 8:
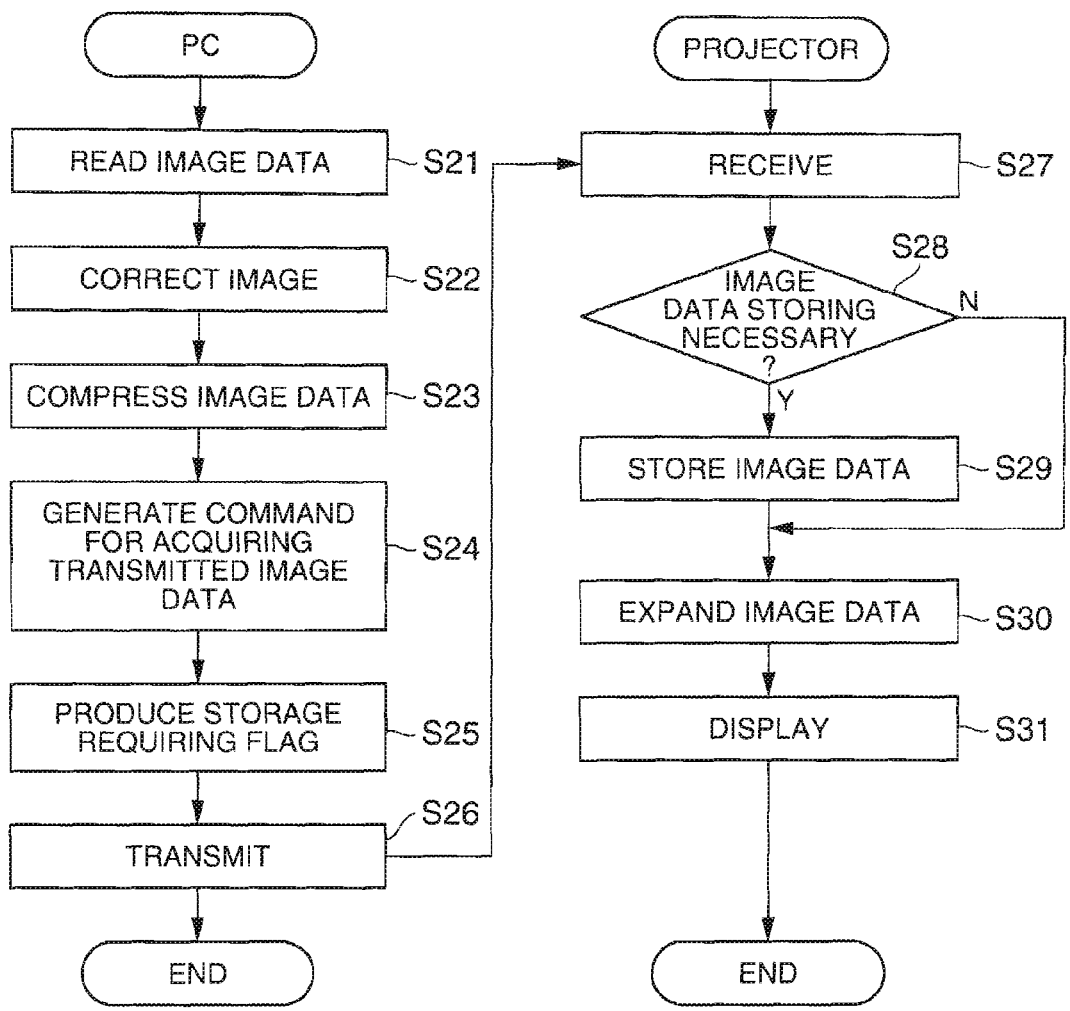
FIG. 8 is a flowchart showing an operation of the image display system in the second embodiment.

The operation of the projection system 1 having this structure at the time of real-time display according to this embodiment is now discussed with reference to FIG. 8. The operation at the time of reproduction display based on the image data stored in the projector 3 is similar to that in the first embodiment, and the same explanation is not repeated herein.

When it is judged that real-time display has been required in the PC 2, the image information acquiring unit 2351 acquires image data in the picture image source from the auxiliary memory 233 and decrypts the image data (step S21).

The image correction processing unit 2352 performs shape converting process and tone converting process for the decrypted image (step S22), and the image information compression unit 2353 compresses the processed image data (step S23).

The processed image information acquisition command unit 236 generates a command for commanding the projector 3 to acquire the transmitted image data (step S24). The image information storage requiring unit 237 produces a storage requiring flag for requiring the projector 3 to store the image data based on the operation information inputted by the user through the operation unit 21, for example (step S25).

The transmission and reception unit 231 transmits the acquisition command, the storage requiring flag, and the corrected and compressed image data to the projector 3 via the USB cable 4 (step S26).

After step S26, the transmission and reception unit 321 of the projector 3 receives the acquisition command, the storage requiring flag, and the corrected and compressed image data. The processed image information acquiring unit 325 acquires image data from the transmission and reception unit 321 in response to the acquisition command (step S27).

The storing operation executing unit 324 judges whether storing operation of the image data is required or not based on the storage requiring flag (step S28). When it is determined that the storing operation has been required, the storing operation executing unit 324 adds various types of header information about the image data to the image data, and stores the resultant image data as one unit of data in the image information storing unit 323 (step S29).

The image information expanding unit 326 expands the compressed image data obtained by the processed image information acquiring unit 325 (step S30). The liquid crystal panel drive control unit 327 outputs a drive signal based on the expanded image data to the liquid crystal light valve 312 so that the liquid crystal light valve 312 can form an optical image corresponding to the processed image data (step S31).

According to this embodiment, it is judged whether operation for storing the image data processed by the PC 2 and transmitted to the projector 3 is required or not. Thus, only the required image data is stored in the image information storing unit 323. Accordingly, unnecessary image data is not stored in the image information storing unit 323.

Third Embodiment

The third embodiment according to the invention is hereinafter described with reference to the drawings.

According to the first and second embodiments described above, the projector 3 displays an image corresponding to image data transmitted from the PC 2 in real time, or displays reproduction of an image corresponding to image data stored in the image information storing unit 323.

Figure 9:
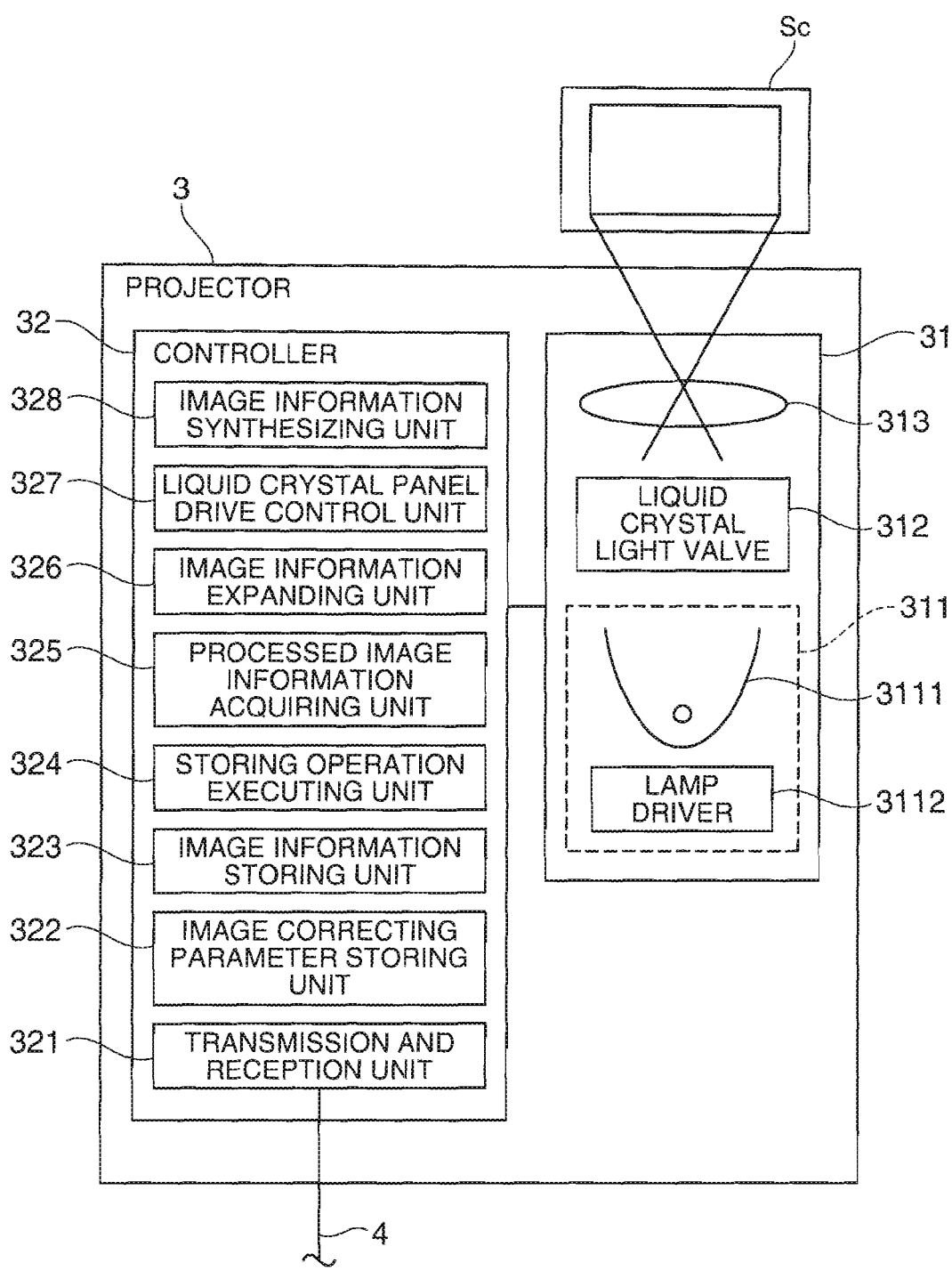
FIG. 9 is a block diagram showing a general structure of an image display apparatus in a third embodiment according to the invention.

An image display system according to the third embodiment is different to the image display systems in the above embodiments in that an image information synthesizing unit 328 is provided in the projector 3 as shown in FIG. 9. This structure can provide so-called picture-in-picture display where an image corresponding to image data transmitted from the PC 2 in real time and an image corresponding to image data stored in the image information storing unit 323 are overlapped on display.

More specifically, the image information synthesizing unit 328 of the projector 3 synthesizes the image data sequentially acquired from the transmission and reception unit 231 and the image data acquired from the image information storing unit 323 to produce final image data, and transmits the produced image data to the liquid crystal panel drive control unit 327.

Figure 10:
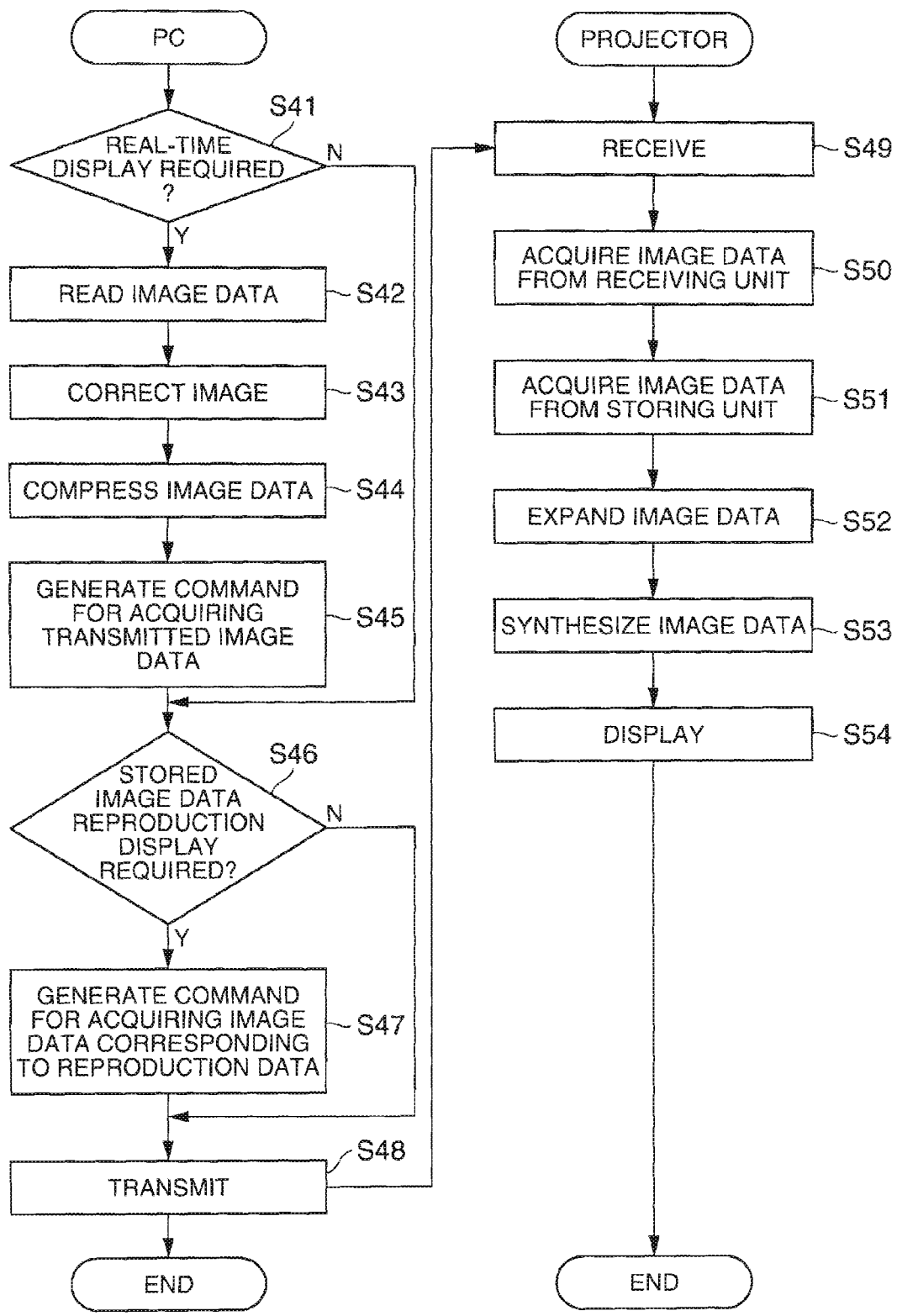
FIG. 10 is a flowchart showing an operation of an image display system in the third embodiment.

The operation of the projection system 1 performed when both real-time display and reproduction display of the stored image data are required according to this embodiment is now discussed with reference to FIG. 10. The operation performed when only one of these displays is required is similar to the operation in the first embodiment, and the same explanation is not repeated herein.

The controller 23 of the PC 2 judges whether real-time display is required by the user based on the operation information inputted by the user (step S41).

When it is determined that real-time display has been required by the user, the image information acquiring unit 2351 acquires image data from the auxiliary memory 233, and decrypts the obtained image data for each frame by executing processing such as decoding and IC conversion for the image data (step S42).

After step S42, the image correction processing unit 2352 executes shape conversion processing and tone conversion processing for the decrypted image data (step S43). The image information compressing unit 2353 compresses the processed image data (step S44).

Then, the processed image information acquisition command unit 236 generates a command for commanding the projector 3 to acquire the processed image data (step S45).

After step S45, the controller 23 judges whether reproduction display of image data stored in the projector 3 is required by the user based on the operation information inputted by the user (step S46).

When it is determined that reproduction display of the stored image data has been required by the user, that is, when the user has selected particular reproduction data information from reproduction data information, the processed image information acquisition command unit 236 generates a command for commanding the projector 3 to acquire image data corresponding to the selected reproduction data information from the image information storing unit 323 of the projector 3 (step S47).

Then, the transmission and reception unit 231 transmits the corrected and compressed image data, the command for commanding acquisition of this image data, and the command for commanding acquisition of the stored image data from the image information storing unit 323 to the projector 3 via the USB cable 4 (step S48).

After step S48, the transmission and reception unit 321 of the projector 3 receives the transmitted image data and the respective acquisition commands from the PC 2 (step S49). The processed image information acquiring unit 325 acquires the image data transmitted from the transmission and reception unit 321 (step S50).

In addition the processed image information acquiring unit 325 acquires relevant image data from the image data stored in the image information storing unit 323 in response to the acquisition command (step S51).

Then, the image information expanding unit 326 expands the image data obtained from the transmission and reception unit 321 and the image data obtained from the image information storing unit 323 (step S52).

Then image information synthesizing unit 328 synthesizes the image data sequentially obtained from the PC 2 and the image data obtained from the image information storing unit 323 to produce final image data (step S53). Then liquid crystal panel drive control unit 327 outputs a drive signal based on the synthesized image data to the liquid crystal light valve 312 to overlap an optical image corresponding to the image data sequentially obtained from the PC 2 and an optical image corresponding to the image data obtained from the Image information storing unit 323 (step S54).

Figure 11:
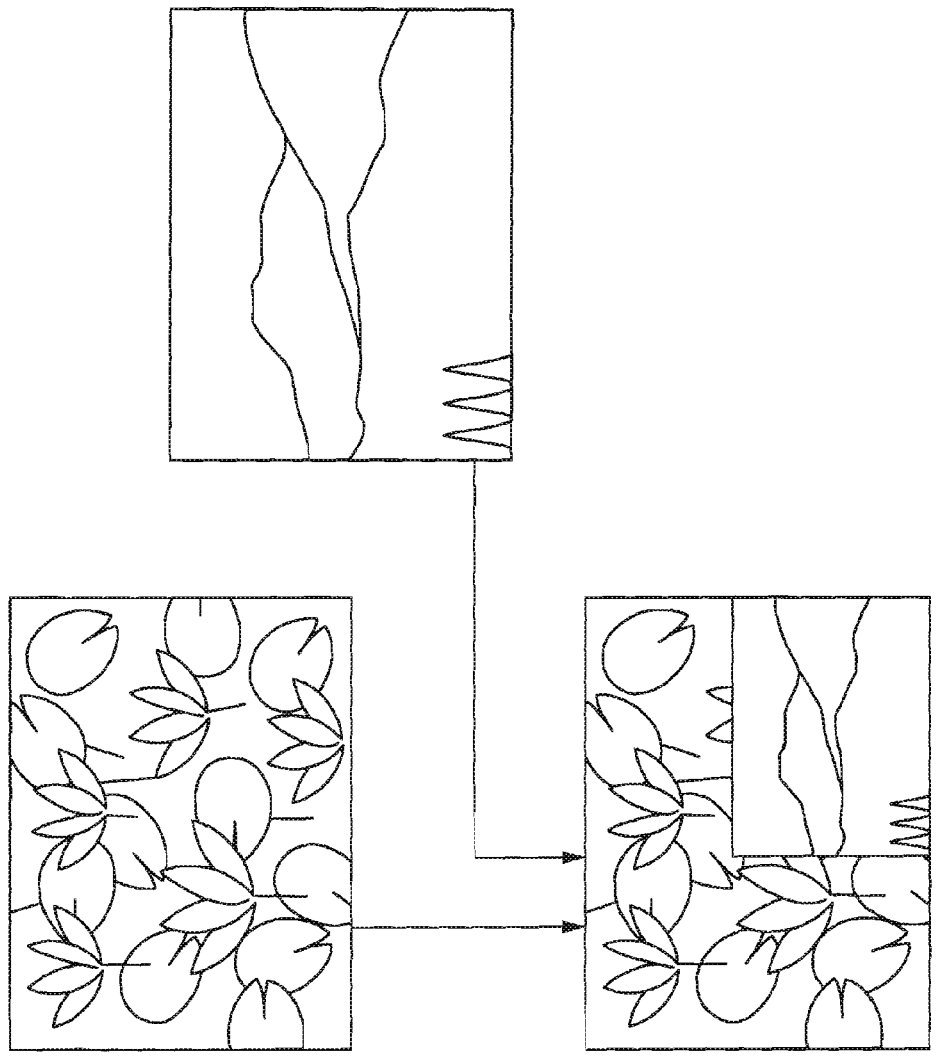
FIG. 11 illustrates a display image at the time of image information synthesis of the image display system in the third embodiment.

According to this embodiment, the projector 3 can simultaneously display both the image corresponding to the image data transmitted from the PC 2 and the image corresponding to the image data stored in the image information storing unit 323 as illustrated in FIG. 11.

MODIFIED EXAMPLE

It should be stated that the invention is not limited to the embodiments described herein. The following modifications may be given to the embodiments, for example; as long as an advantage of some aspects of the invention is achievable.

While the image information compressing unit 2353 is provided in the PC 2 and the image information expanding unit 326 is provided in the projector 3 in the respective embodiments described above, neither image information compressing unit 2353 nor the image information expanding unit 326 may be provided.

While image data is acquired by operating the PC 2 at the time of reproduction display of the image corresponding to the image data stored in the image information storing unit 323, the image data may be obtained through a user interface of the projector 3. In this case, the image can be displayed only by using the projector 3. This user interface may be attached to the housing of the projectors or may be selected from a menu displayed on the screen Sc using a remote controller.

While the most preferred structures and the like are disclosed in the above embodiments, the invention is not limited thereto. That is, while particular embodiments of the invention have been shown and described in detail, it will be obvious to those skilled in the art that various changes and modifications in view of numbers and other detailed structures may be given to the above embodiments without departing from the technical spirits and advantages of the invention.

The invention is applicable to an image display system having a projector, which is used for presentation and home theater.

The entire disclosure of Japanese Patent Application No. 2006-235138, filed Aug. 31, 2006 is expressly incorporated by reference herein.

What is claimed is:

1. An image display system, comprising an information processing apparatus and an image display apparatus,
the information processing apparatus including:
an image processing unit that creates processed image information by acquiring image information and executing predetermined image processing for the acquired image information,
a processed image information acquisition command unit that generates an acquisition command which is transmitted to the image display apparatus, and
an information transmitting unit that transmits the processed image information and the acquisition command to the image display apparatus, wherein the image display apparatus is connected to the information processing apparatus such that information is transmittable to and receivable from the information processing apparatus via the information transmitting unit; and
the image display apparatus including:
an image receiving unit that receives the processed image information transmitted from the information processing apparatus via the information transmitting unit,
a non-volatile image information storing unit that is configured to store the processed image information,
a storing operation executing unit that detects the presence or absence of a storage requiring signal that is transmitted with the processed image information and executes a storing operation for storing the processed image information in the image information storing unit if the storage requiring signal is detected, but does not execute the storing operation for storing the processed image information in the image information storing unit if the storage requiring signal is not detected,
a processed image information acquiring unit that acquires at least either the processed image information received by the information receiving unit or the processed image information stored in the image information storing unit in response to the acquisition command, and
an image display control unit that commands a display unit to display an image corresponding to the processed image information acquired by the processed image information acquiring unit.

2. The image display system according to claim 1, wherein:
the image display apparatus includes an image information synthesizing unit that synthesizes the processed image information; and
when an acquisition command for acquiring the processed image information received by the information receiving unit and the processed image information stored in the image information storing unit is given, the processed image information acquiring unit sequentially acquires the processed image information received by the information receiving unit from the information receiving unit and acquires the processed image information stored in the image information storing unit from the image information storing unit, and the image information synthesizing unit synthesizes both types of the processed image information acquired by the processed image information acquiring unit.

3. The image display system according to claim 1, wherein:
the information processing apparatus includes an image information compressing unit that compresses the processed image information; and
the image display apparatus includes an image information expanding unit that expands the compressed processed image information.

4. The image display system according to claim 1, wherein:
the information processing apparatus includes an image information storage requiring unit that generates the storage requiring signal for requiring storage of the processed image information transmitted from the information transmitting unit, and transmits the storage requiring signal via the information transmitting unit; and
the storing operation executing unit of the image display apparatus executes the storing operation for storing the processed image information in the image information storing unit in response to the storage requiring signal.

5. The image display system according to claim 1, wherein the image display apparatus is a projector.

6. The image display system according to claim 1, wherein the non-volatile image information storage unit is within a housing of the image display apparatus.

7. An image display apparatus, comprising:
an information receiving unit that receives processed image information transmitted from an information processing apparatus via an information transmitting unit;
a nonvolatile image information storing unit that is configured to store the processed image information;
a storing operation executing unit that detects the presence or absence of a storage requiring signal that is transmitted with the processed image information and executes a storing operation for storing the processed image information in the image information storing unit if the storage requiring signal is detected, but does not execute the storing operation for storing the processed image information in the image information storing unit if the storage requiring signal is not detected;
a processed image information acquiring unit that acquires at least either the processed image information received by the information receiving unit or the processed image information stored in the image information storing unit in response to an acquisition command transmitted from the information processing apparatus via the information transmitting unit; and
an image display control unit that commands a display unit to display an image corresponding to the processed image information acquired by the processed image information acquiring unit.

8. The image display apparatus according to claim 7, wherein the image display apparatus is a projector.

9. The image display apparatus according to claim 7, wherein the non-volatile image information storage unit is within a housing of the image display apparatus.

* * * * *